March 9, 1937. L. H. PHILLIPS 2,073,563
LOG LOADING DEVICE
Filed May 28, 1936 3 Sheets-Sheet 3
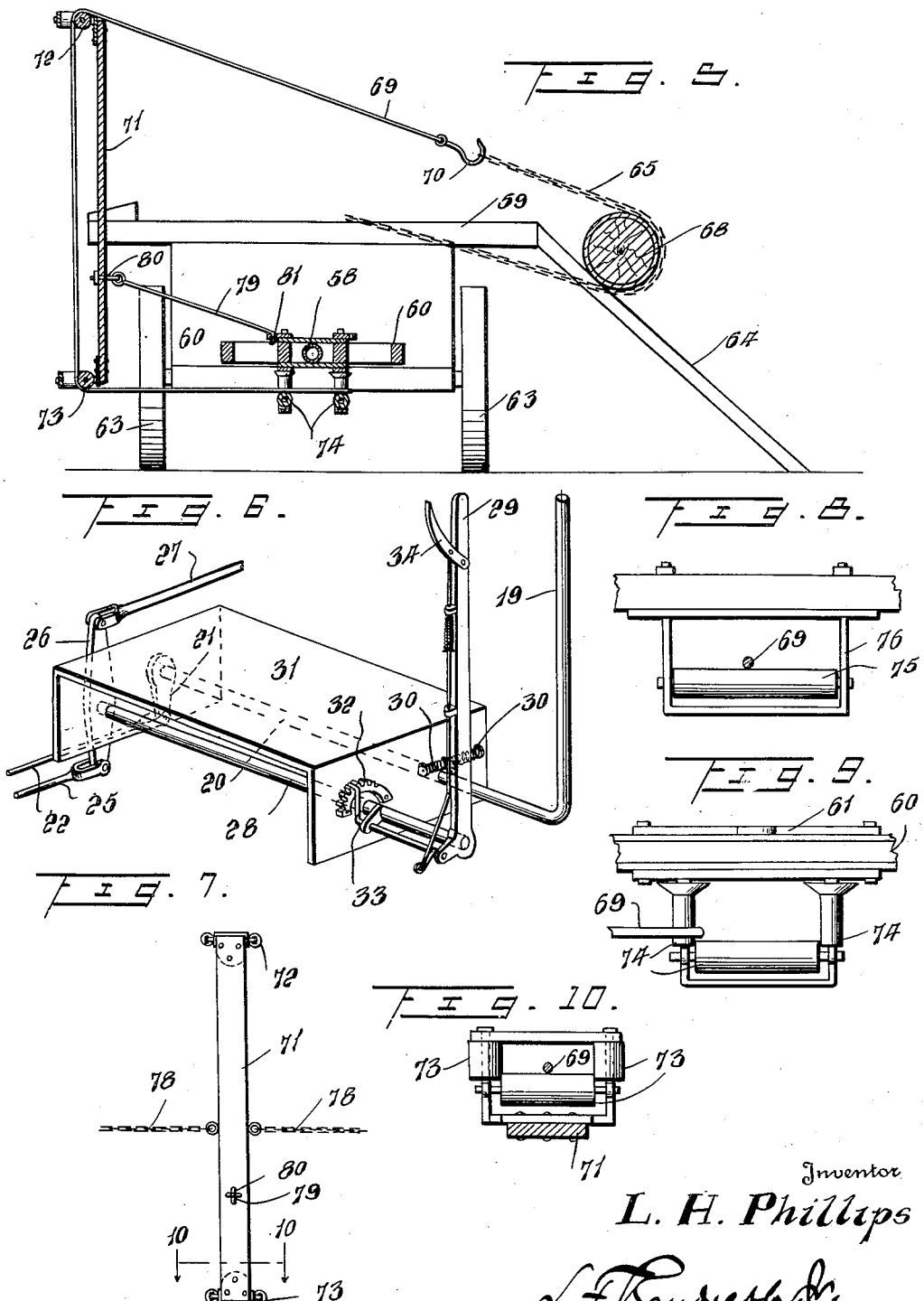
Inventor
L. H. Phillips Patented Mar. 9, 1937

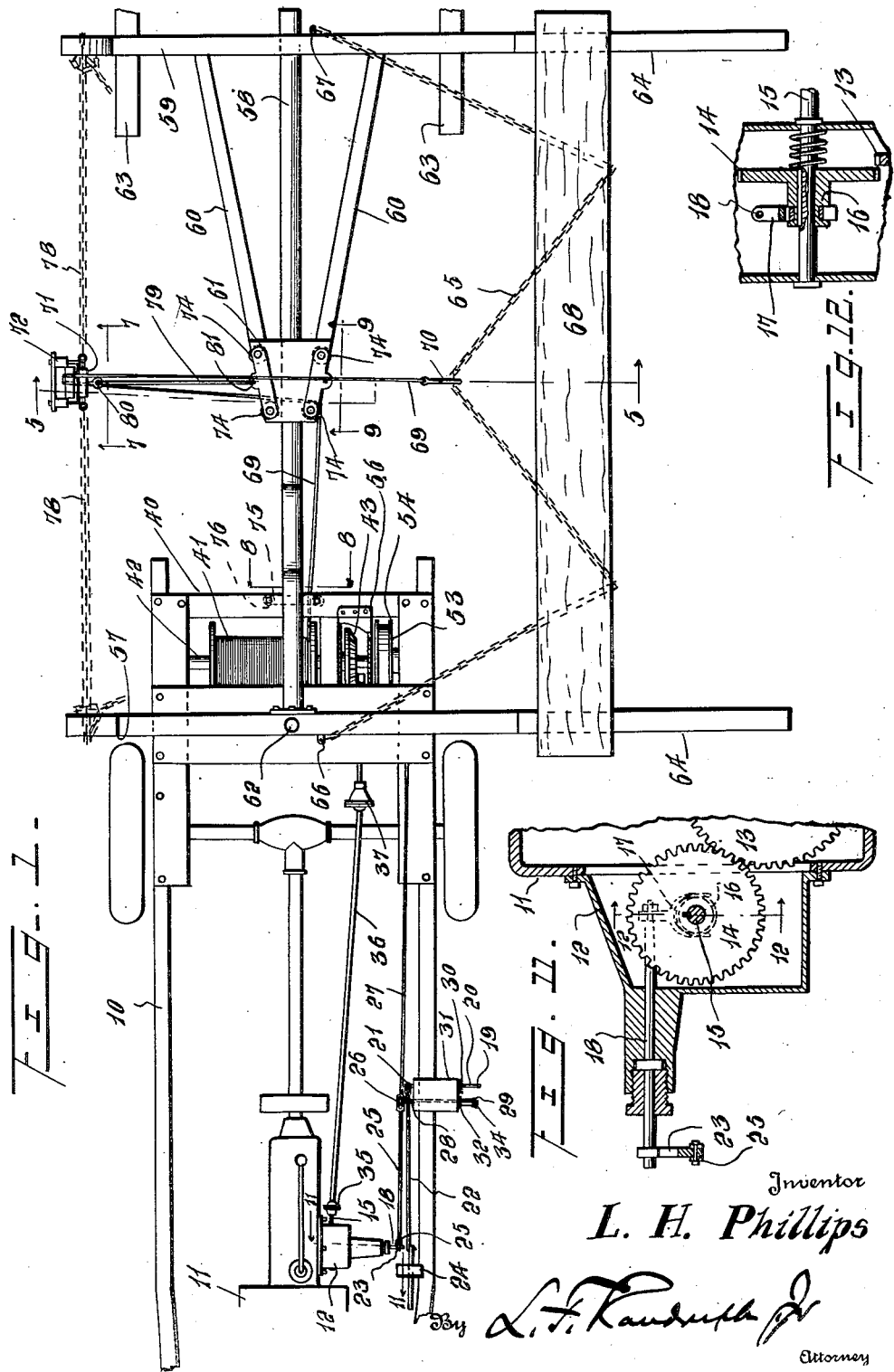

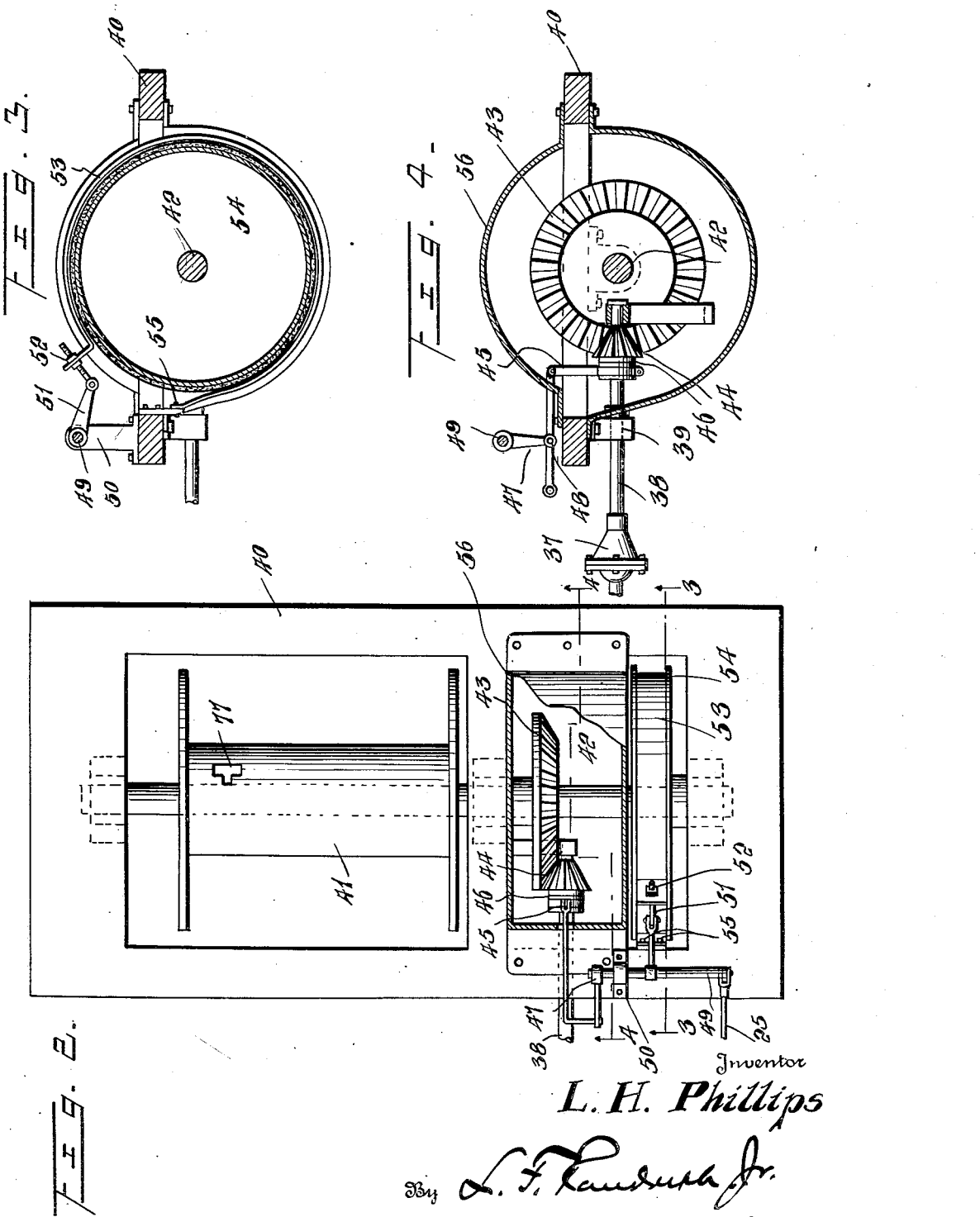

2,073,563

UNITED STATES PATENT OFFICE 2,073,563

LOG LOADING DEVICE

Lonnie H. Phillips, New Albany, Miss.

Application May 28, 1936, Serial No. 82,353

5 Claims. (Cl. 214—85)

This invention relates to a log loading device and more particularly to one carried by and operable from the power unit of a self-propelled truck, to the end that loading may be made more expeditious and will avoid the necessity of resorting to the use of unnecessary manual labor and draft animals.

The more specific objects and advantages will become apparent from a consideration of the description following taken in connection with accompanying drawings illustrating an operative embodiment.

In said drawings:—

Figure 1 is a plan view showing the improvements embodied in a self-propelled truck;

Figure 2 is an enlarged plan view, partly in section, of the rear end portion of the truck;

Figure 3 is a cross sectional view taken on the line 3—3 of Figure 2;

Figure 4 is a cross sectional view taken on the line 4—4 of Figure 2;

Figure 5 is a cross sectional view taken on the line 5—5 of Figure 1;

Figure 6 is a detail perspective view showing the controls for the transmission and for the windlass;

Figure 7 is a detail section taken on the line 7—7 of Figure 1;

Figure 8 is a detail section taken on the line 8—8 of Figure 1;

Figure 9 is a detail section taken on the line 9—9 of Figure 1;

Figure 10 is a detail section taken on the line 10—10 of Figure 7;

Figure 11 is a detail section taken on the line 11—11 of Figure 1; and

Figure 12 is a detail section taken on the line 12—12 of Figure 11.

Referring specifically to the drawings wherein like reference characters designate like or similar parts, 10 represents a conventional truck having a propelling engine at 11 including a transmission case 12 and transmission gearing 13 therein. In accordance with the present invention, a gear 14 is slidably mounted on a rod 15 within the transmission case 12 which gear is normally demeshed from the gear 13 so that the truck may operate in the usual manner. However when it is desired to operate the improvements, the gear 14 is meshed with the gear 13 so as to be operated from the engine 11 when desired, and at which time of course the engine 11 has the gears in neutral position. In order to operate the gear 14, which is slidable and splined on the rotating rod or shaft 15, the gear 14 has a hub 16 engaged by a yoke 17 rigid with a rod 18 adapted to be rocked through the actuation of a hand lever 29, connected to a cross shaft 28 having a crank 26 connected to a link 25 which is also connected to a crank 23 rigid on the rock shaft 18. Obviously any suitable mechanism may be used to secure the lever 29 in neutral and applied positions. 14' designates an expansible coil spring that normally holds gear 14 out of mesh with gear 13.

The depressible clutch pedal of the vehicle 10 is shown at 24 and operatively connected thereto is a pitman 22 pivoted or connected to a vertical lever 21 having a pitman 27 pivoted thereto and extending rearwardly therefrom. Said lever 26 is rigid on a rock shaft 28 operable by a lever 29 which is normally held in a vertical or neutral position by expansive springs 30 engaging opposite sides thereof. The shafts 28 and 20 are conveniently journalled in a bracket 31 which is fastened to one of the side seams or other part of the chassis of the vehicle 10. Rigid on the bracket 31 is a toothed segment 32 with which a latch mechanism 33, carried by the lever 29, is engageable to hold the rock shaft 28 and associated parts in different positions, the latch mechanism being operable by a lever and connected parts as at 34.

The aforesaid shaft 15 has a universal joint connection at 35 with a shaft 36 also having a universal joint connection at 37 with a shaft 38 journalled in a suitable bearing 39.

Carried on the rear end of the vehicle or truck 10 is a frame or bed plate 40 which mounts a suitable windlass mechanism. This mechanism comprises a drum or reel 41 rigid on a rotatable shaft 42 journalled in suitable bearings on the bed plate. Keyed to the shaft 42 is a beveled gear wheel 43. The aforesaid bearing 39 depends from the bed plate 40. Slidably splined on the shaft 38 so as to turn therewith, is a beveled gear 44 adapted to mesh with the beveled gear 43 in order to drive the same.

A yoke 45 engages an extension 46 of the beveled gear wheel 44 and is in the nature of a lever to which a crank 47 is pivoted at 48. Said crank 47 is rigid with a rock shaft 49 journalled in a suitable bearing 50 on the bed plate and having a crank 51 extending therefrom and operatively connected at 52 to the free end of a contractile brake band 53 surrounding a brake drum 54 keyed to the aforesaid shaft 42.

One end of the brake band 53 is anchored as at 55 to a suitable part of the bed plate as shown in Figure 3. It is clear that the gears 43 and 44 and associated parts may have a suitable housing or cover 56 thereover to protect the same against dirt, dust and the like.

Disposed transversely of the bed plate is a cross beam 57 and extending longitudinally and rearwardly centrally from the cross beam is a pole or beam 58, connected to a rear cross beam 59, such parts 58 and 59 being rigidly connected together and braced as by means of braces 60 and plates 61. The cross beam 57 may be centrally pivoted as at 62 by means of a king bolt or the like to the bed plate 40. Said rear cross beam 59 may have ground wheels 63 suitably connected thereto.

At one end of each of the cross beams 57 and 59, an inclined skid 64 is provided, preferably being detachably connected at the upper ends to the cross beams 57 and 59 in any suitable manner and at their lower ends resting on the ground. A chain or other flexible member of suitable length 65 is connected at its ends at 66 and 67 to the cross beams 57 and 59 respectively. Its intermediate portion may rest upon the ground so that logs or the equivalent as at 68 may be rolled over the intermediate portion thereof and onto or adjacent the skids 64. The intermediate portion of said flexible chain or the like 65 is adapted to be engaged by a cable or flexible element 69 at a detachable hook 70, which element 69 is a draw element and adapted to draw the flexible element 65 across the loading frame 57—58—59 and into abutment with an upright 71 suitably carried by that frame and which upright has suitable guide pulley means at 72 and 73 traversed by the draw cable 69 which also passes between the plate 61 and guide rollers 74 mounted thereby, as well as guide rollers 75 on a bracket 76 suitably fastened to and depending from the bed plate or frame 40, beyond which the draw cable 69 is fastened to said drum 41, as by means of an enlargement or knot on the cable being passed into a T-shaped slot 77 of the drum as best shown in Figure 2. Instead of being rigidly supported, the upright or post 71 may be secured in place merely by means of taut chains or flexible elements 78 fastened thereto midway of the ends and fastened respectively to the cross members 57 and 59. In addition, a hook 79 is pivoted at 80 to the upright 71 and may engage a keeper 81 provided on one of the plates 61.

By means of the invention, logs or the like may be loaded onto the frame 57—59 at the rear of the truck through the motive power of the engine of that truck, conveyed to any desired destination and unloaded. It is clear that the logs in case of difficulties, even when partly raised on the skids 64, may be released or lowered back to the ground with safety.

When the vehicle 10 is idle but with the motor running at 11 and the clutch in neutral position, the lever 19 may be operated to cause the gear 14 to mesh with the gear 13 so that the gear 14 may be driven from the engine, it being clear that when the parts are in neutral position the gear 14 is demeshed with the gear 13. Thereupon the pedal 24 is depressed before the lever 29 is actuated so that the engine clutch will be thrown in, thus causing the engine parts to rotate the shaft 15—36—38 and gear 46, gear 43 and operate the windlass, that is shaft 42 and reel or drum 41, which actuates the cable or flexible element 69 in the manner previously set forth, in the loading and unloading of logs or other articles 68 onto the frame 57—58—59. When operation is to cease, the movement of the lever 29 in the opposite direction will cause shaft 49 to rock, applying the brake band 53 and through the lever 47 and crank 45, sliding gear 44 out of mesh with the gear 43.

Various changes may be resorted to provided they fall within the spirit and scope of the invention.

I claim as my invention:—

1. A device of the class described having a frame onto which logs are adapted to be rolled, a flexible element disposable beneath the log, means to draw the flexible element whereby the log will be rolled onto the frame, said means comprising a windlass, and means to operate the windlass, said frame including an upright, flexible elements connecting the upright on opposite sides to the frame, a hook on the upright engaging the frame, guide means on the upright over which the draw element passes, portions of said first mentioned means being located above and below the flexible elements and movable in substantially the same vertical plane and in opposite directions.

2. A device of the class described having a frame onto which logs are adapted to be rolled, a flexible element disposable beneath the log, means to draw the flexible element whereby the log will be rolled onto the frame, said means comprising a windlass, and means to operate the windlass, said frame including an upright, flexible elements connecting the upright on opposite sides to the frame, a hook on the upright engaging the frame, guide means on the upright over which the draw element passes, portions of said first mentioned means being located above and below the flexible elements and movable in substantially the same vertical plane and in opposite directions, the draw element having a hook engageable with the flexible element, and said draw element at opposite ends being fastened to the frame.

3. A device of the class described having a frame onto which logs are adapted to be rolled, a flexible element disposable beneath the log, means to draw the flexible element whereby the log will be rolled onto the frame, said means comprising a windlass, and means to operate the windlass, said frame including an upright, flexible elements connecting the upright on opposite sides to the frame, a hook on the upright engaging the frame, guide means on the upright over which the draw element passes, portions of said first mentioned means being located above and below the flexible elements and movable in substantially the same vertical plane and in opposite directions, a shaft for the windlass, gearing on the shaft, cooperating gearing, brake means associated with the shaft, and means operable to apply the brake means and demesh the gearing.

4. A device of the class described having a frame onto which logs are adapted to be rolled, a flexible element disposable beneath the log, means to draw the flexible element whereby the log will be rolled onto the frame, said means comprising a windlass, and means to operate the windlass, said frame including an upright, flexible elements connecting the upright on opposite sides to the frame, a hook on the upright engaging the frame, guide means on the upright over which the draw element passes, portions of said first mentioned means being located above and below the flexible elements and movable in substantially the same vertical plane and in opposite directions, a shaft for the windlass, gearing on the shaft, cooperating gearing, brake means associated with the shaft, and means operable to apply the brake means and demesh the gearing, a self-propelled vehicle carrying the frame, means to operate the second mentioned gearing from the prime mover of the self-propelled vehicle, including a shaft, second mentioned gearing being slidable on the latter shaft.

5. A device of the class described having a frame onto which logs are adapted to be rolled, a flexible element disposable beneath the log, means to draw the flexible element whereby the log will be rolled onto the frame, said means comprising a windlass, and means to operate the windlass, said frame including an upright, flexible elements connecting the upright on opposite sides to the frame, a hook on the upright engaging the frame, guide means on the upright over which the draw element passes, portions of said first mentioned means being located above and below the flexible elements and movable in substantially the same vertical plane and in opposite directions, a shaft for the windlass, gearing on the shaft, cooperating gearing, brake means associated with the shaft, and means operable to apply the brake means and demesh the gearing, a self-propelled vehicle carrying the frame, means to operate the second mentioned gearing from the prime mover of the self-propelled vehicle, including a shaft, second mentioned gearing being slidable on the latter shaft, a gear adapted to be meshed with the transmission of the self-propelled vehicle having a control, and a control lever for the means to apply the brake, and a bracket mounting said control means and said control lever on the vehicle.

LONNIE H. PHILLIPS.